United States Patent [19]

Ejiri et al.

[11] Patent Number: 4,968,557

[45] Date of Patent: Nov. 6, 1990

[54] MAGNETIC RECORDING MEDIUM

[75] Inventors: Kiyomi Ejiri; Yutaka Kakuishi; Hiroaki Araki, all of Kanagawa, Japan

[73] Assignee: Fuji Photo Film Co., Ltd., Kanagawa, Japan

[21] Appl. No.: 285,976

[22] Filed: Dec. 19, 1988

[30] Foreign Application Priority Data

Dec. 18, 1987 [JP] Japan .................................. 62-320468

[51] Int. Cl.$^5$ .............................................. G11B 23/00
[52] U.S. Cl. ..................................... 428/323; 428/329; 428/408; 428/425.9; 428/694; 428/900
[58] Field of Search ............... 428/323, 329, 408, 694, 428/900, 425.9

[56] References Cited

U.S. PATENT DOCUMENTS 4,634,633  1/1987  Ninomiya et al. ................... 428/694
4,895,758  1/1990  Sakemoto et al. ................... 428/694

Primary Examiner—Paul J. Thibodeau
Attorney, Agent, or Firm—Sughrue, Mion, Zinn, Macpeak & Seas

[57] ABSTRACT

A magnetic recording medium comprising a non-magnetic support having provided thereon a magnetic layer containing ferromagnetic alloy particles, fine particles of metal oxides and carbon black dispersed in a binder. The ferromagnetic alloy particles have a pH of from 4.5 to 7.5. The carbon black has a pH in a range of from 6.5 to 10.5. At least one kind of fine particles of metal oxides have Mohs' hardness of 5 or higher and pH of at least 3.5 but less than 7.5 and at least one kind of fine particles of metal oxides have Mohs' hardness of 5 or higher and a pH of from 7.5 to 10.5. The binder contains a polymer having at least one kind of an acidic polar group selected from the group consisting of a phosphate group, a phosphoric acid group, a sulfonic acid group, a carboxylic acid group, a metal salt of phosphoric acid group, a metal salt of sulfonic acid group, and a metal salt of carboxylic acid group.

14 Claims, No Drawings

MAGNETIC RECORDING MEDIUM

FIELD OF THE INVENTION

This invention relates to a magnetic recording medium comprising a non-magnetic support having provided thereon a magnetic layer.

BACKGROUND OF THE INVENTION

Magnetic recording media are widely used as audio tapes, video tapes or floppy disks. A magnetic recording medium fundamentally comprises a magnetic layer containing ferromagnetic particles dispersed in a binder which is laminated on a non-magnetic support.

High levels of various characteristics such as electromagnetic characteristics, running durability and running efficiencies are required for a magnetic recording medium. That is, higher abilities for reproducing original sounds are required for an audio tape used for recording and reproducing music. Also excellent electromagnetic characteristics, that is, excellent abilities for reproducing original images are required for a video tape.

Recently, short wave recording has been developed, and a magnetic recording medium using ferromagnetic alloy particles has been developed, as described in JP-A- No. 57-154163. (The term "JP-A" as used herein means an "unexamined published Japanese patent application".) It is known that the electromagnetic characteristics of a magnetic recording medium using ferromagnetic alloy particles fairly fluctuate depending upon the dispersibility of the ferromagnetic alloy particles in the magnetic layer. In other words, even though ferromagnetic alloy particles having excellent magnetic properties are used in order to improve electromagnetic characteristics, these excellent magnetic properties cannot lead to improved electromagnetic characteristics if the state of dispersion of the ferromagnetic alloy particles is poor.

Approaches for improving the state of dispersion of ferromagnetic alloy particles in a magnetic layer conventionally comprise mixing, kneading and dispersing the magnetic coating composition for a long period of time to prepare the magnetic coating composition for forming the magnetic layer, and adding dispersing agents. However, in these approaches, there are problems in that the magnetic properties decrease as a result of the mixing, kneading and dispersing for a long period of time and that the durability of the magnetic layer decreases by adding dispersing agents. It has been recently proposed that a polar group be introduced into the resins which form the binder so that the binder of the magnetic layer can have good affinity with ferromagnetic alloy particles.

For example, JP-A- No. 59-5424, discloses a magnetic recording medium which uses as a binder for the magnetic layer a resin having a predetermined polar group such as a metal sulfonate group in an amount of 50 wt % or more to improve electromagnetic characteristics, particularly at a short wave recording. As described above, ferromagnetic alloy particles are well dispersed in the magnetic layer by using a resin having a polar group as a binder for the magnetic layer. Thus, a magnetic recording medium having improved electromagnetic characteristics can be obtained.

On the other hand, fine particles of metal oxides and carbon black are included in a magnetic layer to maintain running durability which is evaluated in terms of head clogging of a video head or still life, as described in U.S. Pat. No. 4,613,545. Therefore, even though ferromagnetic alloy particles are well dispersed in the magnetic layer by using a binder having a polar group, sufficiently good electromagnetic characteristics cannot be obtained due to the undesirable effect of non-magnetic substances such as the fine particles of metal oxides or carbon black.

SUMMARY OF THE INVENTION

An object of this invention is to provide a magnetic recording medium such as a video tape or an audio tape having excellent electromagnetic characteristics and improved durability, and more particularly to provide a magnetic recording medium having improved electromagnetic characteristics at a recording wavelength of 1 $\mu$m or lower.

The above object has been attained by a magnetic recording medium comprising a non-magnetic support having provided thereon a magnetic layer containing ferromagnetic alloy particles, fine particles of metal oxides and carbon black dispersed in a binder, the ferromagnetic alloy particles having a pH of from 4.5 to 7.5, the carbon black having a pH of from 6.5 to 10.5, the fine particles of metal oxides comprising at least one fine particle having a Mohs' hardness of 5 or higher and a pH of at least 3.5 but less than 7.5 and at least one fine particle having a Mohs' hardness of 5 or higher and a pH of from 7.5 to 10.5, and the binder containing a polymer having an acidic polar group selected from the group consisting of a phosphate group, a phosphoric acid group, a sulfonic acid group, a carboxylic acid group, a metal salt of phosphoric acid group, a metal salt of sulfonic acid group, and a metal salt of carboxylic acid group.

DETALED DESCRIPTION OF THE INVENTION

The pH value of the above-described ferromagnetic alloy particles, carbon black and fine particles of metal oxides is measured in the following manner.

5 g of each sample is added in 100 ml of pure water and is boiled for 5 min. and thereafter cooled at 20° C. for 10 min. and the pH of the thus-obtained aqueous solution is measured. This method is performed in accordance with JIS-K-5101 (No. 24A).

The magnetic recording medium of this invention has the following fundamental structure: a magnetic layer containing ferromagnetic alloy particles, fine particles of metal oxides and carbon black which are dispersed in a binder is provided on a non-magnetic support.

The non-magnetic support for use in this invention includes a film or a sheet of polyesters such as polyethylene terephthalate (PET) or polyethylene naphthalate, polyolefins such as polypropylene, cellulose derivatives such as cellulose triacetate or cellulose diacetate, vinyl resins such as polyvinyl chloride or polyvinylidene chloride, synthetic resins such as polycarbonate, polyamide, polyamide imide or polyimide; non-magnetic metal foils such as aluminum or copper; metal foils such as a stainless foil; paper and ceramic sheet.

The non-magnetic support has a thickness preferably in a range of from 2.5 to 100 $\mu$m, most preferably in a range of from 3 to 70 $\mu$m.

The magnetic recording medium of this invention is comprised of a magnetic layer which is provided on a non-magnetic support and is prepared from the following materials:

(1) Ferromagnetic alloy particles having a pH of from 4.5 to 7.5 as ferromagnetic particles;

(2) Carbon black having a pH of from 6.5 to 10.5;

(3) As fine particles (abrasive agents) of metal oxides, at least one kind of fine particle having a Mohs' hardness of 5 or higher and a pH of at least 3.5 but less than 7.5 and at least one kind of fine particle having a Moh's hardness of 5 or higher and pH of from 7.5 to 10.5;

(4) As a binder, a copolymer having at least one acidic polar group selected from the group consisting of a phosphate group, a phosphoric acid group, a sulfonic acid group, a carboxylic acid group, a metal salt of phosphoric acid group, a metal salt of sulfonic acid group, and a metal salt of carboxylic acid group.

The magnetic recording medium of this invention has fundamentally the above structure. The state of distribution of each material in the magnetic layer is believed to be as follows. That is, the fine particles of metal oxides having a pH of from 7.5 to 10.5 and the carbon black have good affinity with the binder having an acidic polar group, and therefore are uniformly dispersed in the magnetic layer and uniformly distributed in the layer. The ferromagnetic alloy particles having a pH of from 4.5 to 7.5 and the fine particles of metal oxides having a pH of at least 3.5 but less than 7.5 are likely to repel the binder having an acidic polar group, and therefore tend to be present on the surface of the magnetic layer.

Accordingly, ferromagnetic alloy particles having a pH of from 4.5 to 7.5 tend to be present on the surface of the magnetic layer as described above, thereby remarkably improving the electromagnetic characteristics. Among the fine particles of metal oxides, those fine particles having a pH of at least 3.5 but less than 7.5 tend to be present on the surface of a magnetic layer, thereby exhibiting abrasive effects and improving running durability. The other fine particles of metal oxides having a pH of from 7.5 to 10.5 are present in the magnetic layer, function as a reinforcing agent for the magnetic layer and improve running durability without degrading the excellent electromagnetic characteristics which are obtained by having the ferromagnetic alloy particles present on the surface of the magnetic layer in a relatively high proportion. Carbon black is also present in the magnetic layer and does not deteriorate the electromagnetic characteristics of ferromagnetic alloy particles.

As described above, excellent running durability can be obtained while maintaining excellent electromagnetic characteristics in accordance with the above-described structure of the magnetic recording medium.

Ferromagnetic alloy particles for use in this invention include ferromagnetic alloy particles including ferromagnetic metals such as iron, cobalt or nickel. It is necessary for the ferromagnetic alloy particles of this invention to have a pH of from 4.5 to 7.5.

The method for preparing ferromagnetic alloy particles comprises, for example, in case of iron, rendering an aqueous solution of iron ion alkaline or acidic, and reacting the solution to form geothite. The above reaction is generally conducted under alkaline condition. When ferromagnetic alloy particles are treated under alkaline condition, alkaline ferromagnetic alloy particles are finally obtained, and when they are treated under acidic conditions, acidic ferromagnetic alloy particles are finally obtained. Then, the thus-obtained geothite is reduced, and is finally provided with gradual oxidation to obtain ferromagnetic alloy particles. When the above gradual oxidation is performed in an organic solvent, for example, in toluene at a temperature of from room temperature to 100° C., ferromagnetic alloy particles having a pH of from 5 to 7 are obtained. When the gradual oxidation performed in the air, for example, by placing the reduced particles under nitrogen atmosphere at room temperature and gradually introducing oxygen gas into the system to increase the oxygen concentration to the same level as that in air over 6 hours, ferromagnetic particles having a pH of from 8 to 10 can be obtained. In this instance, if the ferromagnetic alloy particles surface treated in the air are also surface treated with benzoic acid, for example, by immersing the particles in a solvent (e.g., methyl ethyl ketone and toluene) containing benzoic acid and drying, particles having a pH of about 6 can be obtained. The above-described method for preparing ferromagnetic alloy particles is a known technology.

Ferromagnetic particles having a pH of from 8 to 10 are generally and often used. Ferromagnetic alloy particles having a pH of from 5 to 7 are not often used. However, when they are used in combination with the other components of this invention, a magnetic recording medium excellent both in electromagnetic characteristics and running durability can be obtained.

It is preferred that the above-described ferromagnetic alloy particles for use in this invention have a $S_{BET}$ specific surface area of 40 m$^2$/g or higher (particularly preferably 45 m$^2$/g or higher), a coercive force (Hc) of 1,000 Oe or higher (particularly preferably 1,300 Oe or higher) and a magnetic flux density ($\sigma s$) of from 100 to 150 emu/g.

The ferromagnetic alloy particles preferably have a metal content of about 75 wt % or more, and about 80 wt % or more of the metal content preferably is at least ferromagnetic metal or alloy (e.g., Fe, Co, Ni, Fe-Co, Fe-Ni, Co-Ni, and Co-Ni-Fe) and 20 wt % or less of the metal content is comprised of other elements (e.g., Al, Si, S, Sc, Ti, V, Cr, Mn, Cu, Zn, Y, Mo, Rh, Pd, Ag, Sn, Sb, B, Ba, Ta, W, Re, Au, Hg, Pb, P, La, Ce, Pr, Nd, Te, and Bi). The above-described ferromagnetic metal may contain a slight amount of water, hydroxides or oxides.

The shape of the ferromagnetic alloy particles is not particularly limited, and those that are acicular, granular, dice-like, rice grain-like or plate-like are generally used. Acicular ferromagnetic alloy particles are most preferably used.

It is necessary in this invention that a polymer used for the binder has at least one acidic polar group selected from the group consisting of a phosphoric acid ester group, a phosphoric acid group, a sulfonic acid group, a carboxylic acid group, a metal salt of phosphoric acid group, a metal salt of sulfonic acid group, and a metal salt of carboxylic acid group. It is preferred that the polymeric binder have the acidic polar group having the following formula:

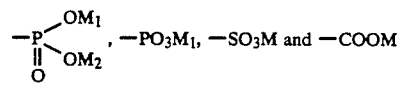

wherein M is a hydrogen atom, Na, Li Or K; and $M_1$ and $M_2$ each is a hydrogen atom, an alkyl group preferably having 1 to 5 carbon atoms (e.g., ethyl), Na, Li or K.

The binder can comprise a mixture of the polymer having the above-described acidic polar group with other polymers. Examples of polymers with or without the above-described polar group for use in the binder of this invention include vinyl chloride copolymers (e.g., copolymer of vinyl chloride and vinyl acetate, copolymer of vinyl chloride, vinyl acetate and vinyl alcohol, copolymer of vinyl chloride, vinyl acetate and acrylic acid, copolymer of vinyl chloride and vinylidene chloride, copolymer of vinyl chloride and acrylonitrile, copolymer of ethylene and vinyl acetate); cellulose derivatives such as nitrocellulose resins, acrylic resins, polyvinyl acetal resins, polyvinyl butyral resins, epoxy resins, phenoxy resins, polyurethane resins (e.g., polyester polyurethane resins, polyether polyurethane resins, and polycarbonate polyurethane resins). These polymers can be used alone or in combination.

When a hardening agent is used, polyisocyanate compounds are generally used. Polyisocyanate compounds are selected from those that are used as components of hardening agents such as those used for hardening polyurethane resins.

When hardening treatment is done by electron beam radiation, compounds having a reactive double bond (e.g., urethane acrylate) can be used.

In this invention, it is preferred that as a polymer, resins having high hardness such as vinyl chloride copolymers and resins having flexibility such as polyurethane resins be used in combination. In this case, it is preferred that the vinyl chloride copolymers have the above polar group in an amount of 5 mol % or less as a component of a monomer having the above polar group, and the polyurethane resins contain the above polar group in an amount of from 0.2 to 10 eq./molecule and preferabbly from 0.3 to 10 eq./molecule.

When the hard resins such as vinyl chloride type copolymers and flexible resins such as polyurethane type resins are used in combination, the compounding weight ratio of the former to the latter is generally 9:1 to 5:5, preferably 9:1 to 6:4. when a hardening agent is used with the above resins(s), the weight ratio of the resin(s) to the hardening agent is generally 9:1 to 5:5 and preferably 9:1 to 6:4.

When polyurethane resins are used as a polymer component and polyisocyanate compounds are used as a hardening agent, the compounding weight ratio of polyurethane type resins and polyisocyanate compounds is generally 1:0.8 to 1:2, preferably 1:1 to 1:1.5. By employing the compounding weight ratio of polyurethane and polyisocyanates as above, a binder which is likely to soften by the use of polyurethane resins can be effectively prevented from softening.

The acidic polar group can be introduced in a polymer in a conventional manner. For example, polyester resins having a metal salt of sulfonic acid can be obtained by condensation reaction of a diol compound and dicarboxylic acid compounds which contains a dicarboxylic acid having a metal salt of sulfonic acid. Polyurethan resins having a metal salt of sulfonic acid can be prepared by condensation and addition reaction of a diisocyanate compound and the stating materials for the polyester resins described above. The acidic polar group can also be introduced by way of modification of a polymer such as polyester resins, polyurethane resins, vinyl chloride resins, etc., for example, by dehydrochloric acid reaction between the polymer and a compound having both the acidic polar group and a chlorine atom in its molecule such as those having the following formula:

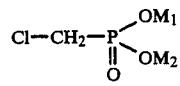

wherein M, $M_1$ and $M_2$ are as defined above.

It is preferred that the polymer having the above-described acidic polar group of this invention be present in an amount of from 10 to 90 wt %, more preferably from 20 to 80 wt %, per total weight of polymers in the binder. It is also preferred that the total weight amount of a resin component and a hardening agent is generally within a range of from 10 to 100 parts by weight, more preferably from 15 to 50 parts by weight, per 100 parts by weight of ferromagnetic alloy particles.

The feature of the magnetic recording medium of this invention is that the magnetic recording medium of this invention contains at least one kind of fine particle (abrasive agents) of a metal oxide having a Mohs' hardness of 5 or higher and having a pH of at least 3.5 and less than 7.5, preferably from 4 to 7, and at least one kind of fine particle of a metal oxide having a Mohs' hardness of 5 or higher and having a pH of from 7.5 to 10.5, preferably from 8 to 10. The weight ratio of the former to the latter is generally from 1:9 to 9:1.

The fine particles of metal oxides having a Mohs' hardness of 5 or higher and a pH of from 4 to 7 include $Cr_2O_3$, $\alpha$-$Fe_2O_3$ and surface treated $Al_2O_3$. It is preferred to use at least one kind of the above particles.

The fine particles of metal oxides having a Mohs' hardness of 5 or higher and a pH of from 8 to 10 include $Al_2O_3$, surface treated $Cr_2O_3$ and surface treated $\alpha$-$Fe_2O_3$. It is preferred to select at least one kind of these particles.

The surface treatment for increasing the pH of the above described $Cr_2O_3$ and $\alpha$-$Fe_2O_3$ can be done by a conventional method, which comprises, for example, impregnating sodium hydroxide in both $Cr_2O_3$ and $\alpha$-$Fe_2O_3$.

Also, surface treatment for decreasing the pH of the above $Al_2O_3$ is done by a conventional method, which comprises, for example, coating solid acid (e.g., chromium oxide, $\alpha$-iron oxide, titanium oxide, cerium oxide) on a surface of the above metal oxides, as described in Japanese patent application No. 61-281866.

The above-described solid acid is coated on the surface of metal oxides by the following methods (i)-(vi).

(i) The fine particles coated with, for example $Cr_2O_3$ can be obtained by (1) the method which comprises dipping the fine particles to be coated in an aqueous solution of chromate such as $(NH_4)_2Cr_2O_7$, $K_2Cr_2O_7$ or $Na_2Cr_2O_7$, drying and heat-decomposing at 300° to 800° C. for 15 minutes to 6 hours, (2) the method which comprises dispersing the particles in an aqueous solution of chromate, precipitating and depositing $Cr(OH)_3$ on the surface of the particles by means of adjusting pH to the acidic side, and heat-decomposing at 300° to 800° C. for 15 minutes to 6 hours, and (3) the method which comprises dipping the fine particles in the above aqueous solution of chromate, reducing (in the presence of $SO_2$, glycerin or starch) and heat decomposing. The above-described aqueous solution of chromate preferably is a saturated aqueous solution of chromate. The saturated aqueous solution of chromate is prepared by dissolving chromate in water by means of mixing and stirring chromate with water in a mortar until chromate is saturated in the water.

(ii) The fine particles coated with $\alpha$-$Fe_2O_3$ can be obtained by the method which comprises dipping the fine particles to be coated in a saturated aqueous solution of iron salt such as $FeSO_4$, $Fe_2(SO_4)_3$, $FeCl_2$, $FeCl_3$, $Fe(NO_3)_2$ or $Fe(NO_3)_3$, drying and heat decomposing at 400° to 1000° C. for 15 minutes to 6 hours. More specifically, the above method comprises putting, for example, alumina particles and a saturated aqueous solution of $FeSO_4$ in an apparatus, stirring them for 1 hour to have the alumina particles sufficiently impregnated with the above aqueous solution, taking the particles out of the apparatus, drying them for half a day or one day, pulverizing the dried particles in a coffee mill for 10 minutes, calcinating at 1000° C. for 1 hour, washing with water for one or two days to eliminate impure ions, drying for half a day, and further pulverizing for 10 minutes to adjust the predetermined degree of granulation. Another method comprises precipitating and depositing $Fe(OH)_3$ on the particles to be coated, and heat decomposing at 400° to 1000° C. for 15 minutes to 6 hours. Still another method comprises heating and evaporating FeCl to precipitate and deposit $FeCl_3$ on the fine particles to be coated, followed by steam treatment.

(iii) The fine particles can be coated with $B_2O_3$ and can be prepared by the method which comprises dispersing the particles to be coated in an aqueous solution of $B_2O_3$, evaporating, drying to solidify the particles, and heating at 400° C. for 1 hour.

(iv) The fine particles can be coated with ZnO and can be prepared by the method which comprises dispersing the particles to be coated in an aqueous solution of zinc oxalate, evaporating, drying to solidify the particles and heating at 400° C. for 1 hour.

(v) The fine particles coated with $CeO_2$ can be prepared in the same manner as above using an aqueous solution of cerium acetate. (vi) The fine particles can be coated with $ZnO$-$ZrO_2$ and can be prepared in the same manner as above using an aqueous solution of a mixture of zinc oxalate and zirconium acetate in a desired mixing ratio.

The fine particles of the above-described metal oxides used in this invention have an average particle diameter of 0.7 $\mu$m or lower, preferably 0.5 $\mu$m or lower. The content of these fine particles is preferably in a range of from 1 to 15 wt % per ferromagnetic alloy particles.

A feature of the magnetic layer of this invention is that the magnetic layer contains carbon black having a pH of from 6.5 to 10.5. Carbon black generally used in a magnetic recording medium has a comparatively low pH value at an acid side. The above-described carbon black having a comparatively high pH value has low oil adsorption, is less volatile, and is not often used in a magnetic recording medium. However, the effect of this invention can be obtained by using, in combination, the above-described carbon black and the above-described binder having an acidic polar group.

Any carbon black can be used in this invention provided that the carbon black has a pH in the above-described range and has an average particle diameter of 100 m$\mu$ or lower. Carbon black has an average particle diameter of preferably 50 m$\mu$ or lower, more preferably 30 m$\mu$ or lower. The DBP (dibutyl phthalate) oil absorption amount of carbon black is preferably from 75 to 230 ml/150 g. The content of carbon black is preferably from 0.1 to 10.0 wt %, more preferably from 0.3 to 5.0 wt %, per ferromagnetic alloy particles.

The magnetic coating composition is prepared by mixing, kneading and dispersing the above-described polymer, hardening agents, fine particles of metal oxides, carbon black and ferromagnetic alloy particles with a solvent which is generally used for preparing a magnetic coating composition (e.g., methyl ethyl ketone, dioxane, cyclohexanone, ethyl acetate). Mixing, kneading and dispersing are performed in a conventional manner.

In addition to the above components, additives conventionally used such as antistatic agents (e.g., carbon black), lubricating agents (e.g., fatty acid, fatty acid ester, silicone oil) or dispersing agents or fillers may be included in the magnetic coating composition.

The magnetic coating composition prepared from the above-described materials is coated on a non-magnetic support in a conventional manner. That is, the components for forming the magnetic layer such as polymers, fine particles of metal oxides, carbon black or ferromagnetic alloy particles, and if desired, hardening agents are mixed, kneaded and dispersed with a solvent to prepare a magnetic coating composition. The thus-prepared magnetic coating composition is coated on a non-magnetic support to form a magnetic layer.

Coating can be performed in a conventional manner, such as by using a reverse roll.

The magnetic coating composition preferably is coated so that each magnetic layer of the magnetic recording medium has a thickness of from 0.5 to 10 $\mu$m.

A backing layer may be provided on a non-magnetic support of this invention on the surface opposite to the surface provided with the magnetic layer. The backing layer is generally formed by coating the opposite surface with a coating composition which contains granular components such as abrasive agents or antistatic agents and a binder dispersed in an organic solvent.

An adhesive layer may be provided on the surface of the non-magnetic support which is to be coated with the magnetic coating composition, and an adhesive layer may also be provided on the surface of the support which is to be coated with a coating composition for forming a backing layer.

The layer which is formed by coating with a magnetic coating composition is generally provided with magnetic orientation to orientate the ferromagnetic particles contained in that magnetic layer, and then the layer is dried.

After the magnetic layer is dried, it can be provided with surface treatment. Surface smoothing treatment is done, for example, using a super calender roll. Voids generated by the removal of a solvent at drying disappear by providing surface smoothing treatment. In this manner, the packing density of the ferromagnetic particles in the magnetic layer is improved. As a result thereof, a magnetic recording medium having high electromagnetic characteristics can be obtained.

Then, the hardened laminate is slit to a desired shape. Slitting is done in a conventional manner, using a generally used cutting machine such as a slitter.

The invention will be illustrated in more detail by the following Examples and Comparative Examples, but is not to be construed as being limited thereto. In each Example and Comparative Example, all parts are by weight, unless otherwise mentioned.

EXAMPLE 1

Coating composition for a magnetic layer:

| | |
|---|---|
| Ferromagnetic alloy particles | 100 parts |
| (Fe—Ni alloy (Fe:Ni = 9:1 (weight ratio)) | |
| Hc: 1520 Oe, $\sigma s$: 125 emu/g, pH = 6, | |
| $S_{BET}$ specific surface area: 50 m$^2$/g) | |
| Vinyl chloride-vinyl acetate copolymer | 4 parts |
| containing a sodium sulfonate group | |
| (amount of the sodium sulfonate group: | |
| 2.5 mol %, degree of polymerization 400) | |
| Polyester polyurethane resin containing | 12 parts |
| a sodium sulfonate group | |
| (amount of the sodium sulfonate group: | |
| 1.5 eq./mole, Mw = 30,000) | |
| $\alpha$-Al$_2$O$_3$ | 3 parts |
| (pH = 8.5, average particle diameter 0.3 $\mu$m) | |
| Cr$_2$O$_3$ | 3 parts |
| (pH = 5.0, average particle diameter 0.2 $\mu$m) | |
| Carbon black | 3 parts |
| (pH = 8.0, average particle diameter 20 m$\mu$, | |
| DBP oil absorption amount 90 ml/150 g) | |
| Stearic acid | 2 parts |
| Butyl stearate | 1 part |
| Polyisocyanate | 4 parts |
| ("Collonate L" made by Nippon Polyurethane | |
| Co., Ltd.) | |
| Butyl acetate | 200 parts |

All components except polyisocyanate were mixed, kneaded and dispersed in a sand mill, and thereafter, polyisocyanate was added in a ball mill and mixed with the above for 20 minutes. The thus-obtained dispersion was filtrated using a filter having an average pore diameter of 1 $\mu$m to prepare a magnetic coating composition for a first magnetic layer.

The thus-obtained coating composition for a magnetic layer was coated in a dry thickness of 3.0 $\mu$m on a polyethylene terephthalate support having a thickness of 10 $\mu$m and running at a speed rate of 60 m/min. using a reverse roll. The magnetic layer was provided with magnetic orientation using magnets, dried, subjected to a super calendering treatment, and slit to a 8 mm width to prepare a video tape.

EXAMPLE 2

A video tape was prepared by following the same procedure as in Example 1 except that the ferromagnetic alloy particles had a pH of 7 (instead of 6) and $\alpha$-Al$_2$O$_3$ which had a pH of 5 and which was surface treated with chromium oxide was used instead of the Cr$_2$O$_3$ having a pH of 5.

EXAMPLE 3

A video tape was prepared by following the same procedure as in Example 1 except that the carbon black had a pH of 7 (instead of 8), the $\alpha$-Al$_2$O$_3$ had a pH of 10 (instead of 8.5), and $\alpha$-Fe$_2$O$_3$ having a pH of 6 was used instead of Cr$_2$O$_3$ having a pH of 5.

EXAMPLE 4

A video tape was prepared by following the same procedure as in Example 1 except that Cr$_2$O$_3$ surface treated with sodium hydroxide and having a pH of 8.0 (instead of $\alpha$-Al$_2$O$_3$ having pH of 8.5), Cr$_2$O$_3$ having a pH of 4 (instead of 5) and the two kinds of polymers but having a polar group of —PO$_3$H (instead of —SO$_3$Na) were used.

EXAMPLE 5

A video tape was prepared by following the same procedure as in Example 1 except that ferromagnetic alloy particles having a pH of 5 (instead of 6), carbon black having a pH of 10 (instead of 8), $\alpha$-Al$_2$O$_3$ having a pH of 9.0 (instead of 8.5), and $\alpha$-Fe$_2$O$_3$ having a pH of 7 (instead of Cr$_2$O$_3$ having pH of 5) were used.

COMPARATIVE EXAMPLE 1

A video tape was prepared by following the same procedure as in Example 1 except that ferromagnetic alloy particles having a pH of 9 (instead of 6), carbon black having a pH of 5 (instead of 8), and 6 parts of Cr$_2$O$_3$ having a pH of 5 (instead of 3 parts thereof) were used, and also $\alpha$-Al$_2$O$_3$ having a pH of 8.5 was not used.

COMPARATIVE EXAMPLE 2

A video tape was prepared by following the same procedure as in Comparative Example 1 except that ferromagnetic alloy particles having a pH of 10 (instead of 9) and carbon black having a pH of 8 (instead of 5) were used.

COMPARATIVE EXAMPLE 3

A video tape was prepared by following the same procedure as in Example 1 except that 6 parts of $\alpha$-Al$_2$O$_3$ having a pH of 8.5 (instead of 3 parts thereof) was used, and Cr$_2$O$_3$ having a pH of 5 was not used.

COMPARATIVE EXAMPLE 4

A video tape was prepared by following the same procedure as in Example 1 except that ferromagnetic alloy particles having a pH of 9 (instead of 6) were used.

COMPARATIVE EXAMPLE 5

A video tape was prepared by following the same procedure as in Example 1 except that ferromagnetic alloy particles having a pH of 4.5 (instead of 6) and carbon black having a pH of 3 (instead of 8) were used.

COMPARATIVE EXAMPLE 6

A video tape was prepared by following the same procedure as in Example 1 except that carbon black having a pH of 3 (instead of a pH of 8) and the two kinds of polymers but having no polar group were used.

Evaluation of Video tapes

The characteristics of the thus-obtained video tapes in the Examples and Comparative Examples were evaluated in the following manner. Magnetic coating compositions in each of the Examples are shown in Table 1, and the results are shown in Table 2.

Measurement (1) Y·C/N

C/N of color signals of each video tape was measured using a noise meter ("9Z5R" made by Shibasoku Co., Ltd.). Values indicated in Table 1 are relative values when C/N of illuminance signals of a video tape prepared in Comparative Example 1 was 0 dB. In this instance, a high pass filter at 10 kHz and a low pass filter at 10 kHz were used. The video tape recorder used in the measurement was commercially available.

(2) Still life

Using a commercially available 8 mm type video tape recorder, the period of time for a video output to decrease by 6 dB on a still mode was measured.

TABLE 1

| | Magnetic particles (pH) | Carbon (pH) | Metal oxides pH 7.5 to 10.5 (M/pH/parts) | Metal oxides pH 3.5 to 7.5 (M/pH/parts) | Polar group |
|---|---|---|---|---|---|
| Example | | | | | |
| 1 | 6 | 8 | A/8.5/3 | C/5.0/3 | —SO$_3$Na |
| 2 | 7 | 8 | A/8.5/3 | A/5.0/3 | —SO$_3$Na |
| 3 | 6 | 7 | A/10.0/3 | F/6.0/3 | —SO$_3$Na |
| 4 | 6 | 8 | C/8.0/3 | C/4.0/3 | —PO$_3$H |
| 5 | 5 | 10 | A/9.0/3 | F/7.0/3 | —SO$_3$Na |
| Comparative Example | | | | | |
| 1 | 9 | 5 | — | C/5.0/6 | —SO$_3$Na |
| 2 | 10 | 8 | — | C/5.0/6 | —SO$_3$Na |
| 3 | 6 | 8 | A/8.5/6 | — | —SO$_3$Na |
| 4 | 9 | 8 | A/8.5/3 | C/5.0/3 | —SO$_3$Na |
| 5 | 4.5 | 3 | A/8.5/3 | C/5.0/3 | —SO$_3$Na |
| 6 | 6 | 3 | A/8.5/3 | C/5.0/3 | — |

In Table 1, M in the metal oxides represents kinds of materials of fine particles of metal oxides. A stands for α-Al$_2$O$_3$, C stands for Cr$_2$O$_3$ and F stands for α-Fe$_2$O$_3$.

TABLE 2

| | Y.C/N | Still life |
|---|---|---|
| Example 1 | 3.0 dB | 120 min. or more |
| Example 2 | 3.2 dB | 120 min. or more |
| Example 3 | 2.9 dB | 120 min. or more |
| Example 4 | 2.9 dB | 120 min. or more |
| Example 5 | 3.5 dB | 120 min. or more |
| Comparative Example 1 | 0.0 dB | 120 min. or more |
| Comparative Example 2 | 0.5 dB | 60 min. |
| Comparative Example 3 | 3.0 dB | 30 min. |
| Comparative Example 4 | 1.0 dB | 120 min. or more |
| Comparative Example 5 | −0.5 dB | 120 min. or more |
| Comparative Example 6 | −3.0 dB | 45 min. |

It is clear from the aforementioned Examples that excellent characteristics with respect to Y·C/N and still life are exhibited by the magnetic recording medium of this invention wherein ferromagnetic alloy particles, two kinds of fine particles of metal oxides and carbon black each have predetermined pH values, and binders comprised of a polymer having an acidic polar group are used. Therefore, it can be said that the magnetic recording medium of this invention has both excellent improved electromagnetic characteristics and durability. It will be understood from Comparative Examples 1 through 6 that both electromagnetic characteristics and durability are significantly diminished if any one of conditions of this invention is not satisfactory.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having provided thereon a magnetic layer containing ferromagnetic alloy particles, fine particles of metal oxides and carbon black dispersed in a binder, said ferromagnetic alloy particles having a pH of from 4.5 to 7.5, said carbon black having a pH of from 6.5 to 10.5, said fine particles of metal oxides comprising fine particles having a Mohs' hardness of 5 or higher and a pH of at least 3.5 but less than 7.5 and fine particles having a Mohs' hardness of 5 or higher and a pH of from 7.5 to 10.5, and said binder containing a polymer having at least one acidic polar group selected from the group consisting of a phosphate group, a phosphoric acid group, a sulfonic acid group, a carboxylic acid group, a metal salt of a phosphoric acid group, a metal salt of a sulfonic acid group, and a metal salt of a carboxylic acid group.

2. A magnetic recording medium as claimed in claim 1, wherein the fine particles of metal oxides having a Mohs' hardness of 5 or higher and having a pH of from at least 3 but less than 7.5 comprise fine particles selected from the group consisting of Cr$_2$O$_3$, α-Fe$_2$O$_3$ and surface treated Al$_2$O$_3$.

3. A magnetic recording medium as claimed in claim 1, wherein the fine particles of metal oxides having a Mohs' hardness of 5 or higher and having a pH of from 7.5 to 10.5 comprise fine particles selected from the group consisting of Al$_2$O$_3$, surface treated Cr$_2$O$_3$, and surface treated α-Fe$_2$O$_3$.

4. A magnetic recording medium as claimed in claim 1, wherein the ferromagnetic alloy particles have a coercive force (Hc) of 1,000 Oe or higher and a S$_{BET}$ specific surface area of 40 m$^2$/g or higher.

5. A magnetic recording medium as claimed in claim 1, wherein the binder contains a vinyl chloride copolymer and a polyurethane resin, said vinyl chloride copolymer containing said acidic polar group in an amount of 5 mol % or of less as a component of a monomer having the above polar group, and said polyurethane resin containing said acidic polar group in an amount of from 0.2 to 10 eq./molecule.

6. A magnetic recording medium as claimed in claim 5, wherein the compounding weight ratio of said vinyl chloride copolymer to said polyurethane resins is from 9:1 to 5:5.

7. A magnetic recording medium as claimed in claim 1, wherein the binder contains a polyurethane resin, having said acidic polar group in an amount of from 0.2 to 10 eq./molecule.

8. A magnetic recording medium as claimed in claim 4, wherein the ferromagnetic alloy particles have a magnetic flux density (σs) of from 100 to 150 emu/g.

9. A magnetic recording medium as claimed in claim 1, wherein the binder contains a polyurethane resin and a polyisocyanate compound at the weight ratio of said polyurethane resin to said polyisocyanate compound of from 1:0.8 to 1:2.

10. A magnetic recording medium as claimed in claim 9, wherein the total weight amount of said polyurethane resin and said polyisocyanate compound is from 10 to 100 parts by weight per 100 parts by weight of said ferromagnetic alloy particles.

11. A magnetic recording medium as claimed in claim 1, wherein the polymer containing said acidic polar group is present in said binder in an amount of from 10 to 90 wt % per total weight of polymers in the binder 12. A magnetic recording medium as claimed in claim 1, wherein said fine particles of metal oxides comprise fine particles having a Mohs' hardness of 5 or higher and a pH of from 4 to 7 and fine particles having a Mohs' hardness of 5 or higher and having a pH of from 8 to 10.

13. A magnetic recording medium as claimed in claim 1, wherein said fine particles of metal oxides have an average particle diameter of 0.7 μm or lower.

14. A magnetic recording medium as claimed in claim 1, wherein the content of said fine particles of metal oxides is from 1 to 15 wt % per said ferromagnetic alloy particles.

* * * * *